United States Patent
Höglund et al.

(10) Patent No.: US 10,687,317 B2
(45) Date of Patent: Jun. 16, 2020

(54) TRANSMISSION AND DECODING IN A WIRELESS NETWORK

(71) Applicant: Telefonaktiebolaget LM Ericsson (publ), Stockholm (SE)

(72) Inventors: Andreas Höglund, Solna (SE); Anders Furuskär, Stockholm (SE); Magnus Stattin, Upplands Väsby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 533 days.

(21) Appl. No.: 15/303,761

(22) PCT Filed: Apr. 14, 2014

(86) PCT No.: PCT/SE2014/050461
§ 371 (c)(1),
(2) Date: Oct. 13, 2016

(87) PCT Pub. No.: WO2015/160291
PCT Pub. Date: Oct. 22, 2015

(65) Prior Publication Data
US 2017/0041924 A1    Feb. 9, 2017

(51) Int. Cl.
*H04W 72/04* (2009.01)
*H04L 1/00* (2006.01)
*H04W 72/14* (2009.01)

(52) U.S. Cl.
CPC ........ *H04W 72/0413* (2013.01); *H04L 1/0025* (2013.01); *H04W 72/044* (2013.01); *H04W 72/14* (2013.01)

(58) Field of Classification Search
CPC ........... H04W 72/0413; H04W 72/044; H04W 72/14; H04L 1/0025
See application file for complete search history.

(56) References Cited

U.S. PATENT DOCUMENTS

2006/0189334 A1* 8/2006 Wakabayashi ........ H04W 28/14
                                                      455/500
2009/0323641 A1   12/2009 Futagi et al.
(Continued)

FOREIGN PATENT DOCUMENTS

CN    1770663 A    5/2006
CN   102763363 A   10/2012
(Continued)

OTHER PUBLICATIONS

3GPP, "3rd Generation Partnership Project; Technical Specification Group Radio Access Network; Feasibility study for Further Advancements for E-UTRA (LTE-Advanced) (Release 9)", 3GPP TR 36.912 V9.1.0, Dec. 2009, 1-59.
(Continued)

*Primary Examiner* — Zhensheng Zhang
(74) *Attorney, Agent, or Firm* — Murphy, Bilak & Homiller, PLLC (57) ABSTRACT

There is provided a method performed by a wireless device for supporting transmission to a network node in a wireless communication network according to an embodiment. The method is adapted for a wireless network based on LTE, wherein the wireless device is allowed to transmit on a set of Resource Elements, REs, allocated for transmission to the network node. The method comprises the step (S1) of determining at least one transport format control parameter for at least a first part of the set of REs allocated for transmission. The method further comprises the step (S2) of transmitting, to the network node, an indication representing the at least one determined transport format control parameter on at least a second part of the set of REs allocated for transmission to notify the network node of the determined transport format control parameter(s).

4 Claims, 10 Drawing Sheets

(56) References Cited

U.S. PATENT DOCUMENTS

2012/0044897 A1\* 2/2012 Wager ................. H04L 5/0037
370/329
2013/0128846 A1 5/2013 Golitschek Edler Von Elbwart et al.

FOREIGN PATENT DOCUMENTS

CN 102860105 A 1/2013
WO 2013182422 A1 12/2013

OTHER PUBLICATIONS

Sunna, Lilian, "Contention-based uplink transmission in unscheduled access", Master's Thesis, Jan. 2010, 1-95.
Unknown, Author, "Contention Based Uplink Transmissions", 3GPP TSG-RAN WG2 #66bis, R2-093812, Los Angeles, CA, US, Jun. 29-Jul. 3, 2009, 1-4.
Unknown, Author, "Impacts of contention based uplink in RAN2", Ericsson, ST-Ericsson, 3GPP TSG-RAN WG2 #68bis, R2-100125, Valencia, Spain, Jan. 18-22, 2010, 1-3.
Dahlman, Erik et al., "3G Evolution HSPA and LTE for Mobile Broadband", 2nd Edition, Academic Press, Oxford, Great Britain, 2008, 470-477.

\* cited by examiner

WIRELESS DEVICE ALLOWED TO TRANSMIT ON A SET OF
RESOURCES ALLOCATED FOR TRANSMISSION

Fig. 5

DEVICE DETERMINES
TRANSPORT FORMAT
CONTROL PARAMETER(S)

TRANSMISSION AND DECODING IN A WIRELESS NETWORK

TECHNICAL FIELD

The proposed technology generally relates to communication in a wireless network based on Long Term Evolution, LTE, and more specifically relates to a wireless device and a corresponding method for supporting transmission to a network node, and a network node and a corresponding method for demodulating and/or decoding a transmission received from a wireless device, as well as corresponding computer programs and computer program products.

BACKGROUND

Long Term Evolution, LTE, is a standard for high-performance wireless communication developed by the $3^{rd}$ Generation Partnership Project, 3GPP, with an aim to improve the network capacity, simplify the network architecture, provide improved mobility support, improve the spectrum flexibility, increase the data rates, and reduce latency among other things.

One of the basic principles of the LTE radio access procedure is shared-channel transmission, where radio transmission resources such as time-frequency radio resources are dynamically shared between users. These resources can be shared by dynamic scheduling where the network, usually the eNodeB, takes scheduling decisions and sends scheduling grants to requesting user terminals [1].

However, there is also a possibility in LTE to reduce the control signaling by so-called persistent or semi-persistent scheduling when resource allocation is done on a periodic basis and the scheduling decision applies to every nth subframe [2].

The network can also assign a set of radio resources for contention between users; so-called contention-based transmission [3-6]. In particular, for uplink transmission, contention-based access allows a UE to transmit data without having to first transmit a scheduling request and wait for the corresponding grant. Although contention-based transmission can be seen as a form of unscheduled access or direct access, the overall set of radio resources available for contention between the users is still normally allocated by the network.

Figure 1:
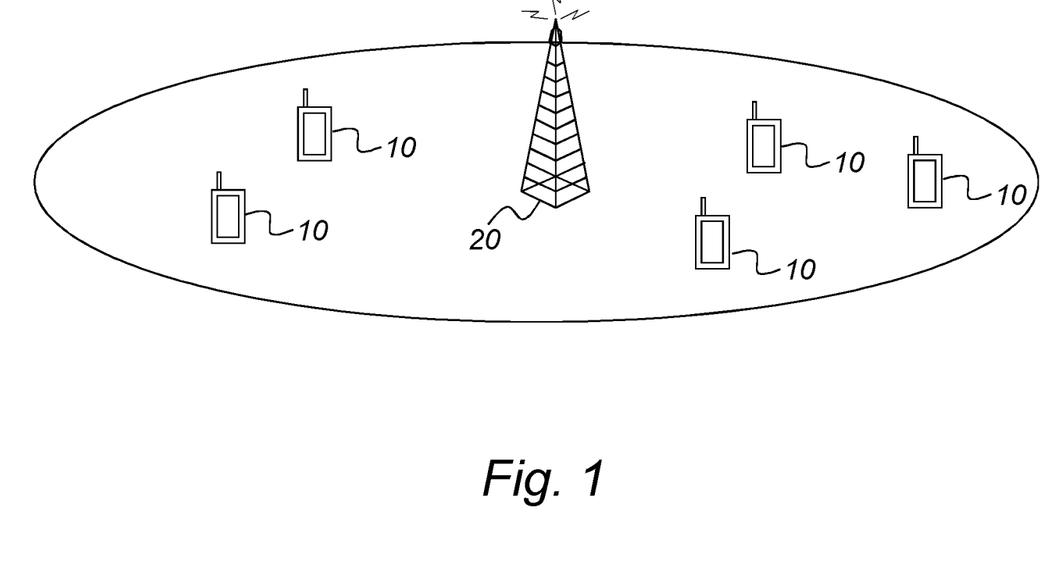
FIG. 1 is a schematic diagram illustrating an example of a wireless communication network based on a network node communicating with a number of wireless devices.

Latency is an important characteristic in wireless communication, and it is generally desirable to reduce the latency experienced by wireless devices such as User Equipment, UEs, in wireless communication networks. This holds true for ordinary cellular communication networks such as that illustrated in FIG. 1, in which a network node such as a base station serves a number of UEs, but is equally important for device-to-device communication.

By way of example, contention-based transmission has been proposed as a means to reduce latency for transmissions in LTE. This is sometimes also referred to as direct access. Recently, contention-based transmission has also been brought up as a candidate to reduce control signaling overhead for small data transmissions.

In the case of uplink traffic, it is most beneficial for UEs to remain in Radio Resource Control, RRC, Connected Mode to avoid the delays and hand-shaking associated with RRC Connection Setup. If extended Discontinuous Reception, DRX, cycle lengths are introduced in RRC Connected mode, UEs could further remain there for very long periods of time to provide low latency and low control signaling overhead without compromising battery life. With a contention-based approach, UEs could avoid having to send a scheduling requests and wait for the replies and instead instantly transmit their data; however at the risk of collision.

Figure 2:
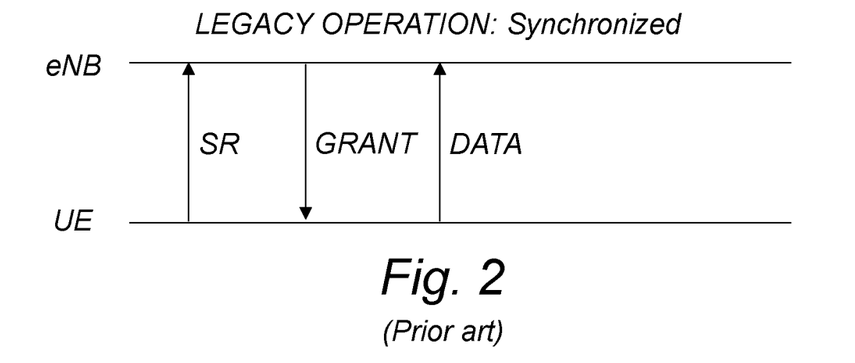
FIG. 2 is a schematic diagram illustrating an example of prior art transmission based on grant allocation according to legacy operation when the UE has synchronization.

FIG. 2 is a schematic diagram illustrating an example of prior art transmission based on grant allocation according to legacy operation when the UE has synchronization.

When a UE has uplink synchronization, i.e. the Timing Advance, TA, timer has not expired, a UE will in legacy operation simply send a Scheduling Request, SR with a Buffer Status Report, BSR, to receive a suitable grant for the transmission of its data.

Figure 3:
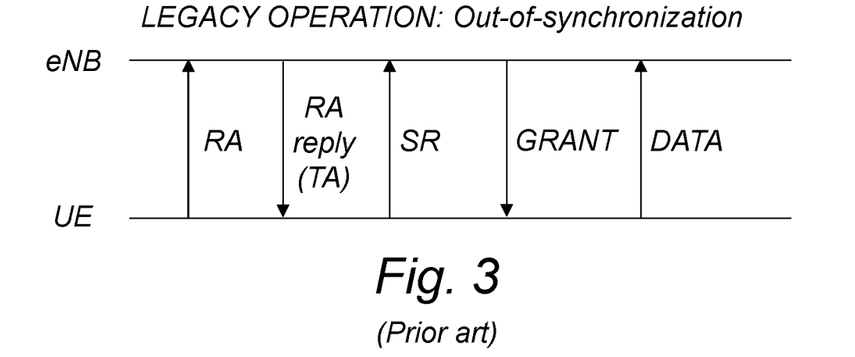
FIG. 3 is a schematic diagram illustrating an example of prior art transmission based on grant allocation according to legacy operation when the UE is out-of-synchronization.

FIG. 3 is a schematic diagram illustrating an example of prior art transmission based on grant allocation according to legacy operation when the UE is initially out-of-synchronization.

In RRC Connected Mode when the UE does not have uplink synchronization, i.e. the TA timer has expired, UEs will have to do a Random Access, RA, to get the TA in the RA reply. Once the UE is synchronized, it can send the SR request to receive a grant for transmission of data.

The RA reply in legacy operation also contains a minimal grant which the UE can use to transmit the SR request and the BSR. This grant however is minimal to provide a very robust RA solution. This means that it is unlikely that any user plane data would fit in this first small grant.

Figure 4:
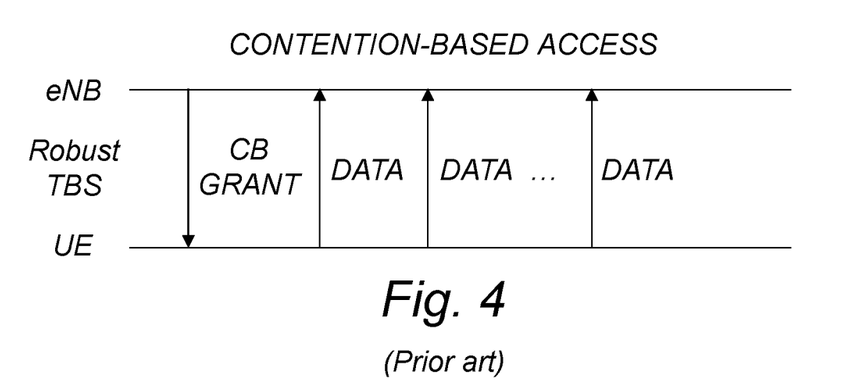
FIG. 4 is a schematic diagram illustrating an example of prior art transmission based on contention-based access to the transmission resources.

FIG. 4 is a schematic diagram illustrating an example of prior art transmission based on contention-based, CB, access to the transmission resources. The eNB sends an initial grant indicating the set of radio resources on which the UE is allowed to transmit. The grant sent from the eNB may also include an indication of the modulation and coding scheme to be used for data transmission. This so-called CB grant is typically transmitted with a robust transport format and Transport Block Size, TBS. The UE can then contend with other UEs for direct access to the radio resources allocated for uplink transmission by the CB grant. Usually, the CB grant points to a particular uplink transmission resource so that the grant is transmitted from the eNB for every uplink data transmission occasion.

A contention-based solution might be favorable, since at least one round-trip could be skipped by transmitting the data directly, without having to wait for a grant (FIG. 2) or without having to first wait for random access round-trip and then wait for the grant (FIG. 3).

With the use of extended DRX cycles it would also become more plausible that UEs would be out-of-synchronization and therefore experience both problems in legacy operation (FIG. 3).

However, in contention-based access, the UE buffer status is generally not known by the network and consequently it would not be possible to optimize the TBS. A small and robust TBS would rather have to be used for all UEs in order to serve the cell-edge UE with the worst radio conditions in a cell. Because of this, conventional contention-based transmission (FIG. 4) may likely be worse than legacy operation (FIG. 2 or FIG. 3) since having to transmit little data in many consecutive subframes may be worse than waiting for a suitable legacy grant to send it all at once.

Conventional contention-based access thus have clearly conflicting properties in that the latency and control signaling overhead is reduced, while the small and robust TBS required to ensure reliable transmissions will lead to a situation where a relatively large number of small data transmissions are required to transfer a given amount of data.

Similar problems with latency, control signaling overhead and data transfer rates can also be encountered in scenarios based on persistent and/or semi-persistent scheduling.

SUMMARY

It is an object to improve communication in a wireless communication network based on LTE.

In particular, it is desirable to reduce latency and/or control signaling overhead for small data transmissions.

It is a specific object to provide a wireless device and a corresponding method for supporting transmission to a network node.

It is also a specific object to provide a network node and a corresponding method for demodulating and/or decoding a transmission received from a wireless device.

Another specific object is to provide a computer program configured to support transmission from a wireless device to a network node, and a corresponding computer program product.

Yet another specific object is to provide a computer program configured to demodulate and/or decode a transmission received from a wireless device, and a corresponding computer program product.

These and other objects are met by embodiments of the proposed technology.

According to a first aspect, there is provided a method performed by a wireless device for supporting transmission to a network node in a wireless communication network based on Long Term Evolution, LTE. The wireless device is allowed to transmit on a set of Resource Elements, REs, allocated for transmission to the network node. The method comprises the step of determining at least one transport format control parameter for at least a first part of the set of REs allocated for transmission. The method further comprises the step of transmitting, to the network node, an indication representing the at least one determined transport format control parameter on at least a second part of the set of REs allocated for transmission to notify the network node of the determined transport format control parameter(s).

By allowing the wireless device to determine one or more transport format control parameters in an LTE-based wireless network and notifying the receiving network node of the transport format control parameters in this way, highly efficient communication with improved data transfer rates, lower latency and/or reduced signaling overhead can be enabled.

The proposed technology is generally applicable to various communication scenarios, e.g. normal uplink transmission or device-to-device communication.

By way of example, the proposed technology can be applied to wireless communications based on contention-based access but also to communication scenarios based on persistent or semi-persistent scheduling.

According to a second aspect, there is provided a method performed by a network node for demodulating and/or decoding a transmission received from a wireless device on a set of Resource Elements, REs, allocated for transmission to the network node in a wireless communication network based on Long Term Evolution, LTE. The method comprises the step of receiving, from the wireless device, an indication representing at least one transport format control parameter for at least partly determining the transport format for at least a first part of the set of REs allocated for transmission, wherein the indication is received on at least a second part of the set of REs allocated for transmission. The method further comprises the step of demodulating and/or decoding data received on at least the first part of the set of REs allocated for transmission at least partly based on the at least one transport format control parameter.

In this way, the receiving network node is allowed to effectively demodulate and/or decode data received from a wireless device based on the transport format control parameter(s).

According to a third aspect, there is provided a wireless device configured to support transmission to a network node in a wireless communication network based on Long Term Evolution, LTE. The wireless device is allowed to transmit on a set of Resource Elements, REs, allocated for transmission to the network node. The wireless device is configured to determine at least one transport format control parameter for at least a first part of said set of REs allocated for transmission. The wireless device is further configured to transmit, to the network node, an indication representing the at least one determined transport format control parameter on at least a second part of the set of REs allocated for transmission to notify the network node of the determined transport format control parameter(s).

According to a fourth aspect, there is provided a network node configured to demodulate and/or decode a transmission received from a wireless device on a set of Resource Elements, REs, allocated for transmission to the network node in a wireless communication network based on Long Term Evolution, LTE. The network node is configured to receive, from the wireless device, an indication representing at least one transport format control parameter for at least partly determining the transport format for at least a first part of the set of REs allocated for transmission, wherein the indication is received on at least a second part of the set of REs allocated for transmission. The network node is configured to demodulate and/or decode data received on at least the first part of the set of REs allocated for transmission at least partly based on the at least one transport format control parameter.

According to a fifth aspect, there is provided a computer program configured to support transmission from a wireless device to a network node on a set of Resource Elements, REs, allocated for transmission to the network node in a wireless communication network based on Long Term Evolution, LTE. The computer program comprises instructions, which when executed by at least one processor, cause the processor(s) to:

determine at least one transport format control parameter for at least a first part of the set of REs allocated for transmission; and prepare an indication representing the at least one determined transport format control parameter for transmission to the network node on at least a second part of the set of REs allocated for transmission.

According to a sixth aspect, there is provided a computer program configured to demodulate and/or decode a transmission received from a wireless device on a set of Resource Elements, REs, allocated for transmission to a network node in a wireless communication network based on Long Term Evolution, LTE. The computer program comprises instructions, which when executed by at least one processor, cause the processor(s) to:

read an indication representing at least one transport format control parameter for at least partly determining the transport format for at least a first part of the set of REs allocated for transmission, the indication being received on at least a second part of the set of REs allocated for transmission; and demodulate and/or decode data being received on at least the first part of the set of REs allocated for transmission at least partly based on said at least one transport format control parameter.

According to a seventh aspect, there is provided a computer program product comprising a computer-readable medium carrying the computer program of the fifth aspect or sixth aspect.

According to an eighth aspect, there is provided a wireless device for supporting transmission to a network node in a wireless communication network based on Long Term Evolution, LTE. The wireless device is allowed to transmit on a set of Resource Elements, REs, allocated for transmission to the network node. The wireless device comprises a determination module for determining at least one transport format control parameter for at least a first part of the set of REs allocated for transmission. The wireless device also comprises a preparation module for preparing an indication representing the at least one determined transport format control parameter for transmission to the network node on at least a second part of the set of REs allocated for transmission.

According to a ninth aspect, there is provided a network node for demodulating and/or decoding a transmission received from a wireless device on a set of Resource Elements, REs, allocated for transmission to the network node in a wireless communication network based on Long Term Evolution, LTE. The network node comprises a reading module for reading an indication representing at least one transport format control parameter for at least partly determining the transport format for at least a first part of the set of REs allocated for transmission, the indication being received on at least a second part of the set of REs allocated for transmission. The network node further comprises a data processing module for demodulating and/or decoding data being received on at least the first part of the set of REs allocated for transmission at least partly based on the at least one transport format control parameter.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with an example of the allocation of a set of radio resources such as time-frequency resources on which at least one wireless device is allowed to transmit.

Figure 5:
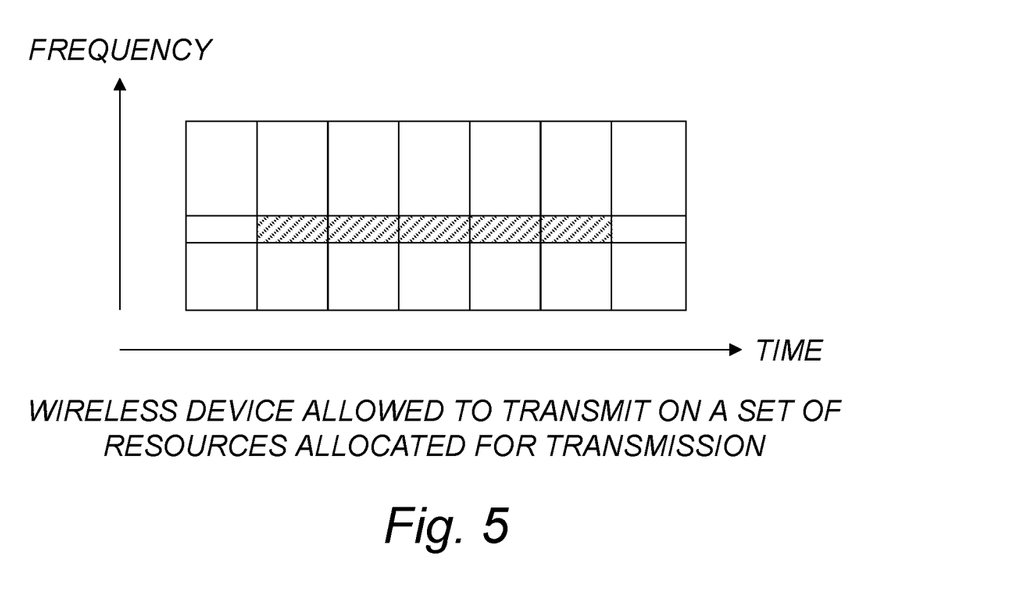
FIG. 5 is a schematic diagram illustrating an example of a set of resources allocated for transmission to a network node on which at least one wireless device is allowed to transmit.

FIG. 5 is a schematic diagram illustrating an example of a set of resources allocated for transmission to a network node on which at least one wireless device is allowed to transmit. The network node may be a radio base station such as an eNodeB or another wireless device in a device-to-device communication scenario.

For example, the set of time-frequency resources allocated for transmission, see the dashed area in FIG. 5, may be a set of resources allocated for contention-based transmission, or a set of device-specific resources allocated for transmission by persistent or semi-persistent scheduling. The set of resources may even be the normal request-grant allocation of radio resources resulting from an uplink scheduling mechanism.

Figure 6:
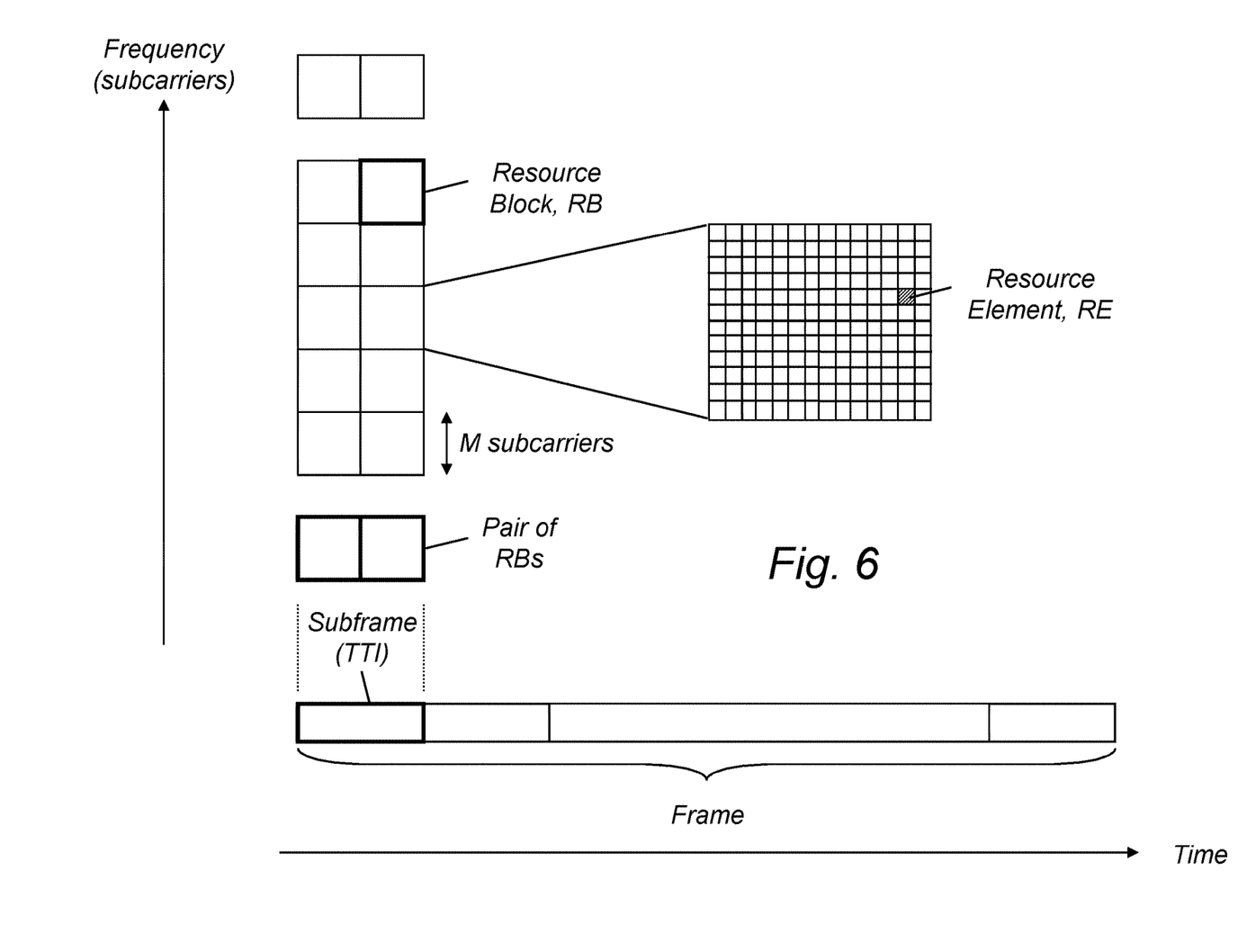
FIG. 6 is a schematic diagram illustrating an example of the structure of the time-frequency resources for radio transmission.

FIG. 6 is a schematic diagram illustrating an example of the structure of the time-frequency resources for radio transmission. This example is particularly valid for LTE. In the time-domain, a frame includes a number of subframes, and a subframe may optionally include one or more time slots. A subframe typically corresponds to a Transmission Time Interval (TTI). A Resource Block, RB, may for example include a number of subcarriers in the frequency domain. The resource blocks are distributed in the frequency domain over a predetermined bandwidth. In the time domain, resource blocks are normally assigned in pairs per subframe.

For the specific example of Long Term Evolution, LTE, one frame is normally 10 ms and includes 10 subframes. One subframe is 1 ms and includes 2 slots. One slot is 0.5 ms in the time domain and each slot can normally be assigned N resource blocks, depending on bandwidth allocation and resource availability. One resource block is 0.5 ms and includes M subcarriers for each OFDM symbol in the frequency domain. Each resource block includes a number of Resource Elements, REs, normally one RE per subcarrier and OFDM symbol. A basic resource unit in LTE is the Resource Element, RE.

When one or more Resource Blocks, RBs, are allocated for uplink transmission, a corresponding set of Resource Elements, REs, are allocated.

Figure 7:
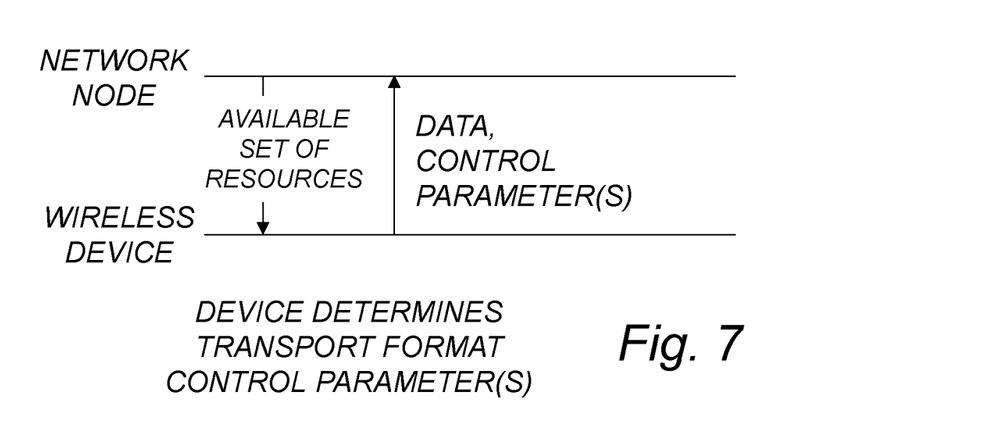
FIG. 7 is a schematic diagram illustrating an example of signaling and/or actions according to the proposed technology.

FIG. 7 is a schematic diagram illustrating an example of signaling and/or actions according to the proposed technology. For example, the network node may notify the wireless device of the available set of resources on which the wireless device is allowed to transmit. The wireless device is then allowed to determine one or more transport format control parameters for at least partly determining the transport format for use in transmission of data and/or control parameters. The wireless device transmits an indication of the control parameter(s) to the network node so that the network node is informed of the transport format, or at least the control parameter(s) to be used for at least partly determining the transport format on the network side.

The proposed technology is also applicable to device-to-device communication. This may also include certain types of machine-type communication transmitted over the wireless network.

For direct device-to-device communication, the network node may be another wireless device. Once the transmitting wireless device is informed about the set of resources allocated for transmission it may select the transport format control parameter(s) and notify the other wireless device of the control parameter(s) to enable reliable and efficient data communication.

Figure 8:
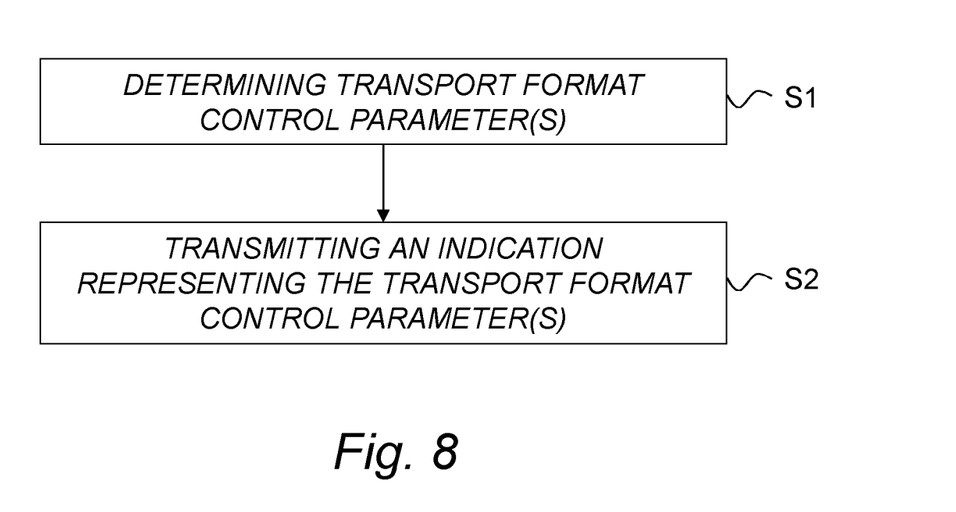
FIG. 8 is a schematic flow diagram illustrating an example of a method for supporting transmission to a network node in a wireless communication network according to an embodiment.

FIG. 8 is a schematic flow diagram illustrating an example of a method performed by a wireless device for supporting transmission to a network node in a wireless communication network according to an embodiment. The method is adapted for a wireless network based on LTE, wherein the wireless device is allowed to transmit on a set of Resource Elements, REs, allocated for transmission to the network node. The method comprises the step S1 of determining at least one transport format control parameter for at least a first part of the set of REs allocated for transmission. The method further comprises the step S2 of transmitting, to the network node, an indication representing the at least one determined transport format control parameter on at least a second part of the set of REs allocated for transmission to notify the network node of the determined transport format control parameter(s).

As previously mentioned, this enables highly efficient communication with improved data transfer rates, lower latency and/or reduced signaling overhead.

In particular, selection of a suitable transport format such as modulation, coding and/or transport block size by the wireless device implies that a larger amount of data can be accommodated per transport block. This effectively leads to more efficient data transfer rates.

By way, of example contention-based direct transmission of data becomes a viable option for LTE. This means lower latency and/or reduced signaling overhead since there is no need to send a scheduling request and wait for the corresponding grant. This is especially important for delay-sensitive traffic. For the same reason, less power-on-time is expected, which means improved battery consumption. This is important for UEs in cellular communication but also for machine-type communication in device-to-device scenarios.

For example, the first part of the set of REs may differ from the second part of the set of REs. Alternatively, the first part of the set of REs is at least partly overlapping with the second part of the set of REs. More specifically, the same set of REs allocated for transmission to the network node can be used to transmit both user plane data and an indication of one or more transport format control parameters valid for the user plane data.

The indication may for example be transmitted using a transport format known by the network node, preferably a robust transport format, to ensure that the network node can decode the indication.

As an example, the wireless device may receive a grant or similar indication indicating the set of REs on which the wireless device is allowed to transmit. This may be a contention-based grant, or a persistent or semi-persistent grant. The grant or similar indication may be transferred from the network side to the considered wireless device(s) in a variety of ways, e.g. by means of system information broadcast or by sending the grant/indication through an accepted control channel such as the standardized Physical Downlink Control Channel, PDCCH. The allocated set of REs may even be hardcoded or pre-configured in the communicating entities, meaning that a particular set of REs may have been appointed for this type of transmission in advance, e.g. through standardization agreements.

As previously indicated, the allocated set of REs may be a set of REs allocated for contention-based transmission, or a set of device-specific REs allocated for transmission by persistent or semi-persistent scheduling. To be more specific, the set of REs allocated for contention-based transmission may be shared time-frequency radio resources under contention between different users. In other words, the users are competing for the resources. The overall contention-based communication protocol normally includes a collision resolution procedure, when two or more users wants to use the same radio resources at the same time.

The interested reader may refer to references [1-6] for more information on scheduling of radio resources, including semi-persistent scheduling, as well as contention-based access.

For the particular example of uplink transmission, the set of REs are allocated for uplink data transmission on the Physical Uplink Shared CHannel, PUSCH. In practice, this means that the indication of the transport format control parameter(s) is sent through a form of in-band control signaling within the shared data channel.

This is particularly favorable, although out-of-band signaling on a separate control channel such as PDCCH is also possible.

As indicated above, the at least one control parameter may represent at least one of: modulation, coding and transport block size. With regard to modulation, Quadrature Amplitude Modulation, QAM, Quadrature Phase Shift Keying, PSK, are examples of possible modulation types. With regard to coding, different coding rates of the applied error correction coding may be selected.

By way of example, the wireless device may determine the at least one transport format control parameter at least partly based on information representative of channel conditions between the wireless device and the network node.

For example, the wireless device may select the transport format based on an estimated signal-to-noise-and-interference-ratio, SINR, at the receiver. This in turn may be calculated based on estimates of the channel gain, $G$, between the UE and the receiver, the transmit power, $P$, an estimated noise level, $N$, at the receiver, and an estimated interference level, $I$, at the receiver, so that $SINR=P*G/(N+I)$. Typically, $G$ and $P$ are known at the UE. $N$ and $I$ could be signaled by the network node such as a base station, set to a predefined value, or estimated based on one or more measurements performed by the wireless device. Based on the estimated SINR, the UE could select the transport format with the highest data rate, which has an error rate less than a desired threshold, e.g. 10%, for the estimated SINR. The wireless device may also take its buffer size into account, and select a transport format that is suitable, e.g. sufficiently large, for the amount of data to be transmitted.

For direct device-to-device communication, the transport format may be selected in a similar way, e.g. by estimating the SINR at the receiver. In this case N and I at the receiver may not be signaled by the network, but could be estimated by the UE, for example based on N and I at the UE. Alternatively, the UE could directly assume that the SINR at the receiving device is the same as at the UE. As a separate solution or complement to the above, the UE may determine or adapt the transport format based on error rates of preceding transmissions.

The wireless device may determine the at least one transport format control parameter such as modulation, coding and/or transport block size within an interval specified by the network, from a predefined set of values specified by the network and/or according to at least one rule specified by the network.

By way of example, the transport format control parameter may be valid for data in a) the same subframe as the control parameter indication, or b) a subsequent subframe relative to the subframe of the indication, or c) a preceding subframe relative to the subframe of the indication, or d) the transport format control parameter may be valid until further notice.

The wireless device may for example be a User Equipment, UE, and the network node may be a base station or another UE.

Figure 9:
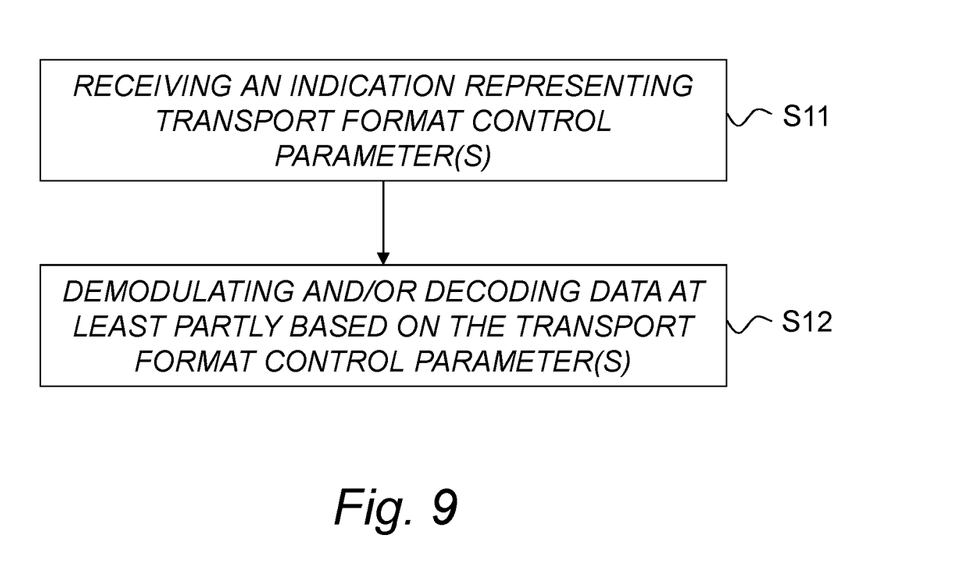
FIG. 9 is a schematic flow diagram illustrating an example of a method for demodulating and/or decoding a transmission received from a wireless device in a wireless communication network according to an embodiment.

FIG. 9 is a schematic flow diagram illustrating an example of a method performed by a network node for demodulating and/or decoding a transmission received from a wireless device in a wireless communication network according to an embodiment. The method is adapted for a wireless network based on LTE, and the transmission is received from a wireless device on a set of Resource Elements, REs, allocated for transmission to the network node. The method comprises the step S11 of receiving, from the wireless device, an indication representing at least one transport format control parameter for at least partly determining the transport format for at least a first part of the set of REs allocated for transmission. The indication is received on at least a second part of the set of REs allocated for transmission. The method further comprises the step S12 of demodulating and/or decoding data received on the at least a first part of the set of REs allocated for transmission at least partly based on the at least one transport format control parameter.

As previously indicated, the first part of the set of REs may differ from the second part of the set of REs. Alternatively, the first part of the set of REs is at least partly overlapping with the second part of the set of REs.

By way of example, it is possible for the network node to transmit a grant to the wireless device indicating the set of REs on which the wireless device is allowed to transmit.

As previously indicated, the set of REs may for example be a set of REs allocated for contention-based transmission, or a set of device-specific REs allocated for transmission by persistent or semi-persistent scheduling.

In a particular example, the set of REs are allocated for uplink data transmission on the Physical Uplink Shared Channel, PUSCH.

For example, the at least one control parameter may represent at least one of: modulation, coding and transport block size.

As an example, the network node transmits information to the wireless device indicating a selection interval, a predefined set of values and/or at least one rule for selection of the at least one transport format control parameter.

As mentioned above, the transport format control parameter may be valid for data in a) the same subframe as the control indication, or b) a subsequent subframe relative to the subframe of the indication, or c) a preceding subframe relative to the subframe of the indication, or d) the transport format control parameter may be valid until further notice.

By way of example, the network node may be a base station or a User Equipment, UE, and the wireless device may be another UE.

Figure 10:
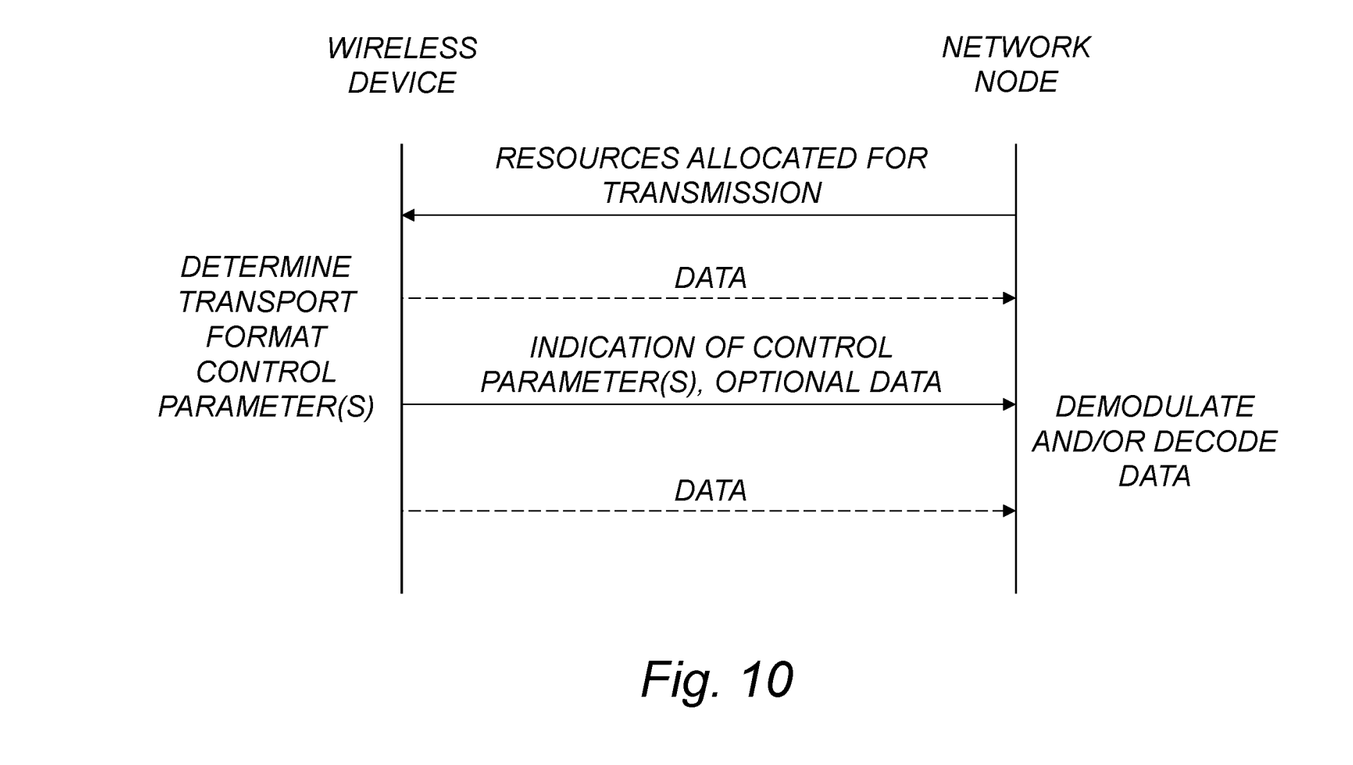
FIG. 10 is a schematic signaling diagram illustrating an example of signaling between a wireless device and a network node in a wireless network according to an embodiment.

FIG. 10 is a schematic signaling diagram illustrating an example of signaling between a wireless device and a network node in a wireless network according to an embodiment.

In this example, the network node sends an indication of the resources allocated for transmission.

The wireless device determines a suitable transport format and corresponding transport format control parameter(s) valid for data transmission, and sends an indication of the control parameter(s) to the network node.

The wireless device also transmits data such as user plane data on the relevant REs using the determined transport format.

The network node may determine the transport format at least partly in response to the received transport format control parameter(s). The data such as user plane data received from the wireless device may then be demodulated and/or decoded based on the determined transport format.

The data transmission may be effectuated before the transmission of the control indication, at the same time as the control indication or after the transmission of the control indication. Normally, the user plane data is transmitted in the same or a subsequent subframe relative to the control indication. However, if a certain delay is acceptable, it may be possible to transmit user plane data in a preceding subframe relative to the control indication, and buffer the data in the receiving network node until the control indication is received and the transport format is determined and ready for use when demodulating and/or decoding the user plane data.

In the following section, the proposed technology will be described with reference to particular non-limiting example embodiments. Although reference is made to uplink transmission, it should be understood that proposed technology is also useful for device-to-device communication, where a coordinating network node provides the overall allocation of the radio resources on which the devices are allowed to transmit.

For example, a wireless device such as a UE would in some pre-defined resource element(s) of the uplink contention-based data resource block notify what transport format or Modulation and/or Coding Scheme, MCS, it uses for the resource elements containing user plane data. The notification could either point to the user plane data resource blocks in the current subframe, to a subsequent subframe, or even to a preceding subframe, or be valid until further notice. The notification would typically be using a fixed and robust MCS such that the network always can decode this part first.

As an example, the wireless device such as a UE could freely select the TBS to accommodate the data but would be upwards limited by the radio conditions. This could e.g. be based on information of the radio conditions, such as DL channel quality or implicit information from previous link adaption or power control used by the UE.

Currently, the smallest scheduling unit in LTE is a pair of resource blocks, RBs, i.e. 180 kHz wide in frequency and two slots in time which equals a 1 ms subframe. A RB is constituted by a grid of resource elements, RE, as illustrated in FIG. 6, where a RE is one OFDM subcarrier for the duration of one OFDM symbol. Since a RB is 12 subcarriers wide in frequency (which are separated by 15 kHz) and 7 (or 6) SC-FDMA symbols long in time when normal (extended) cyclic prefix is used this means that a RB will normally contain 84 (or 72) REs, according to the current standard specifications.

For a scheduled pair of RBs on the PUSCH for an uplink data transmission a few REs may contain reference symbols and other control signaling while the main part carries user plane data. In a particular example, the proposed technology uses one or more REs to instead include an indication of one or more transport format control parameters such as a Modulation and/or Coding Scheme, MCS, indicator to provide the eNodeB with all the information it needs to decode the REs carrying user plane data. With the legacy procedure this is not needed, since UEs only transmit according to the grants they have been given and the eNodeB naturally has all this information already. However, when using contention-based access in the uplink, this indication can enable UEs to transmit instantaneously without having to either wait for a grant or use a TBS which is too small for its buffer, causing unnecessarily many transmissions.

The RE(s) carrying the indication of one or more transport format control parameters can either point to the RE(s) carrying user plane data in the same RB (or pair of RBs), in a subsequent RB (or pair of RBs) or in a preceding RB (or pair of RBs). An alternative embodiment would be that the transport format control parameters are valid until further notice, for example until a new indicator is sent.

Further, a varying degree of freedom for the UEs selection of transport format, such as selection of a suitable TBS, could be imagined. Some are given as examples below:
  The UE selects freely, usually still based on information representative of the radio conditions.
  The UE selects freely within interval specified by network
  The UE selects from a predefined set specified by the network
  The UE selects according to rules specified by the network.

Any combination of these would also be possible. In the case where a predefined set is specified, blind detection could also be a possibility if the set is small enough.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

As used herein, the non-limiting terms "wireless device" and "User Equipment, UE" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPad, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" or "UE" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" or "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, for LTE.

There is provided a wireless device configured to support transmission to a network node in a wireless communication network based on Long Term Evolution, LTE. The wireless device is allowed to transmit on a set of Resource Elements, REs, allocated for transmission to the network node. The wireless device is configured to determine at least one transport format control parameter for at least a first part of the set of REs allocated for transmission. The wireless device is also configured to transmit, to the network node, an indication representing the at least one determined transport format control parameter on at least a second part of the set of REs allocated for transmission to notify the network node of the determined transport format control parameter(s).

For example, the first part of the set of REs differs from the second part of the set of REs, or the first part of the set of REs is at least partly overlapping with the second part of the set of REs.

Preferably, the wireless device may be configured to receive a grant indicating the set of REs on which the wireless device is allowed to transmit.

By way of example, the wireless device is enabled to transmit on a set of REs allocated for contention-based transmission, or a set of device-specific REs allocated for transmission by persistent or semi-persistent scheduling.

In a particular example, the wireless device is enabled to transmit on a set of REs allocated for uplink data transmission on the Physical Uplink Shared Channel, PUSCH.

As previously indicated, the wireless device may for example be configured to determine at least one control parameter representing at least one of: modulation, coding and transport block size.

Figure 11:
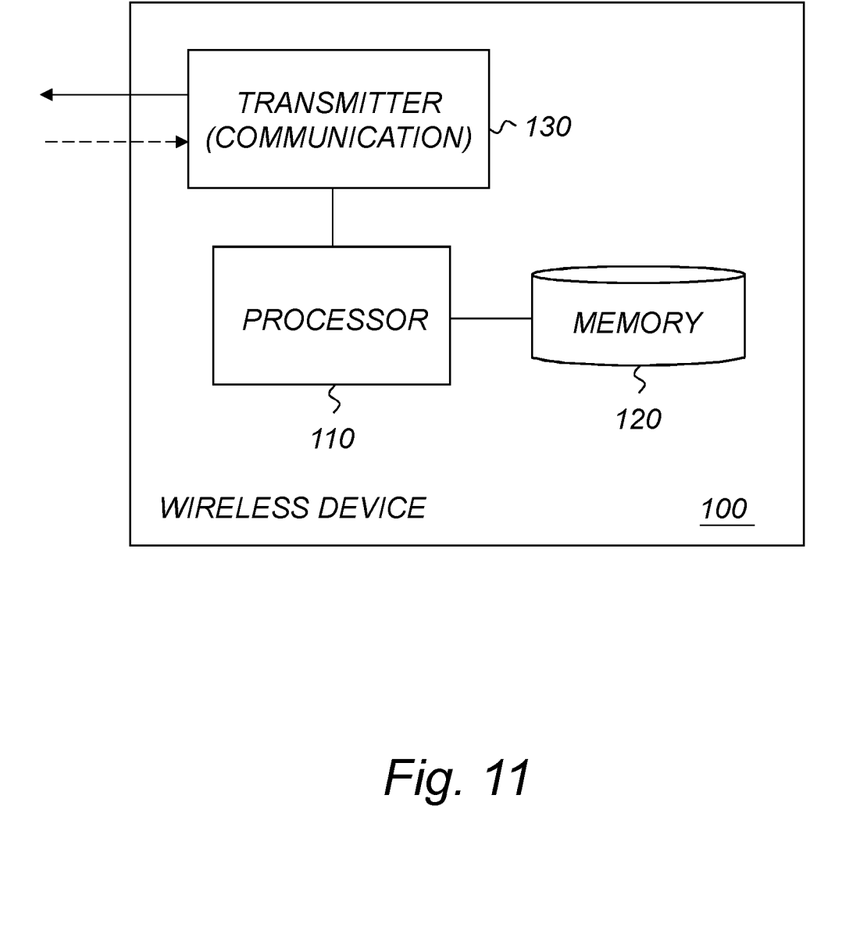
FIG. 11 is a schematic block diagram illustrating an example of a wireless device according to an embodiment.

FIG. 11 is a schematic block diagram illustrating an example of a wireless device according to an embodiment.

In a particular example, the wireless device 100 comprises a processor 110 and a memory 120, the memory 120 comprising instructions executable by the processor 110, whereby the processor 110 is operative to determine the at least one transport format control parameter. The wireless device 100 further comprises a transmitter 130 configured to transmit, to the network node, the indication representing the at least one determined transport format control parameter.

The transmitter 130 may be part of a general communication circuit for communication with one or more other nodes, including transmitting and/or receiving information.

There is also provided a network node configured to demodulate and/or decode a transmission received from a wireless device on a set of Resource Elements, REs, allocated for transmission to the network node in a wireless communication network based on Long Term Evolution, LTE. The network node is configured to receive, from the wireless device, an indication representing at least one transport format control parameter for at least partly determining the transport format for at least a first part of the set of REs allocated for transmission. The indication is received on at least a second part of the set of REs allocated for transmission. The network node is further configured to demodulate and/or decode data received on the at least a first part of the set of REs allocated for transmission at least partly based on the at least one transport format control parameter.

For example, the first part of the set of REs may differ from the second part of the set of REs, or the first part of the set of REs is at least partly overlapping with the second part of the set of REs.

Preferably, the network node may also be configured to transmit a grant to the wireless device indicating the set of REs on which the wireless device is allowed to transmit, as previously discussed.

By way of example, the set of REs may be a set of REs allocated for contention-based transmission, or a set of device-specific REs allocated for transmission by persistent or semi-persistent scheduling.

In a particular example, the set of REs are allocated for uplink data transmission on the Physical Uplink Shared Channel, PUSCH.

Figure 12:
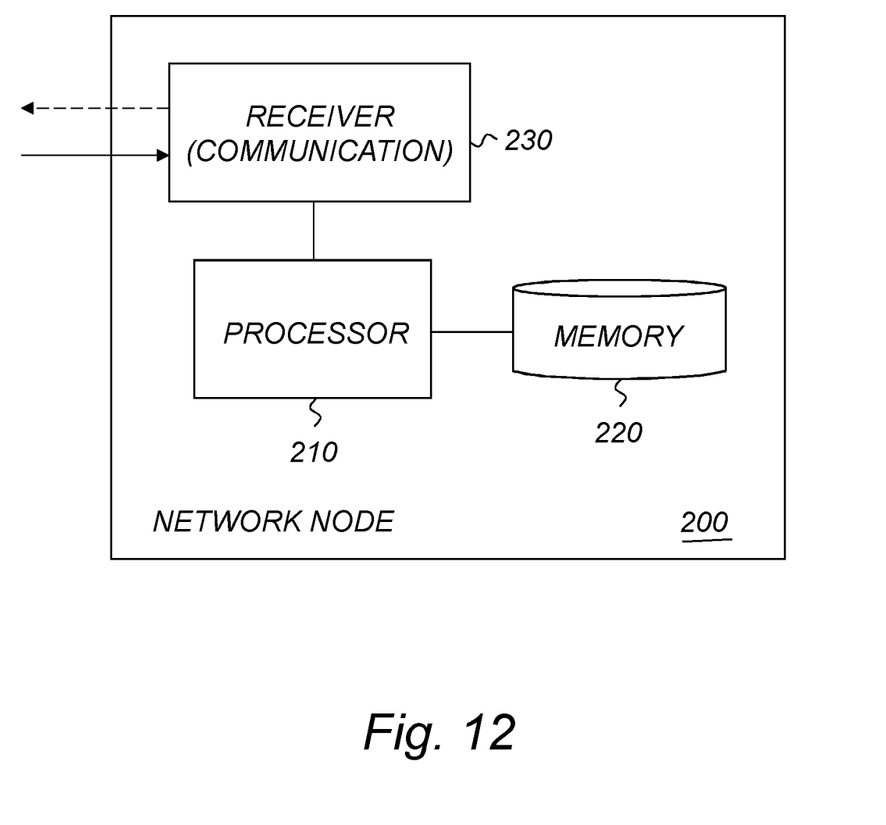
FIG. 12 is a schematic block diagram illustrating an example of a network node according to an embodiment.

FIG. 12 is a schematic block diagram illustrating an example of a network node according to an embodiment.

In a particular example, the network node comprises a processor 210 and a memory 220, the memory 220 comprising instructions executable by the processor 210, whereby the processor 210 is operative to demodulate and/or decode the data received on the at least a first part of the set of REs allocated for transmission. The network node 200 also comprises a receiver 230 configured to receive the indication representing at least one transport format control parameter.

In the examples of FIGS. 11 and 12, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, there is thus provided a computer program configured to support transmission from a wireless device to a network node on a set of Resource Elements, REs, allocated for transmission to the network node in a wireless communication network based on Long Term Evolution, LTE. The computer program comprises instructions, which when executed by at least one processor, cause the processor(s) to:

determine at least one transport format control parameter for at least a first part of the set of REs allocated for transmission; and prepare an indication representing the at least one determined transport format control parameter for transmission to the network node on at least a second part of the set of REs allocated for transmission.

In another particular embodiment, there is provided a computer program configured to demodulate and/or decode a transmission received from a wireless device on a set of Resource Elements, REs, allocated for transmission to a network node in a wireless communication network based on Long Term Evolution, LTE. The computer program comprises instructions, which when executed by at least one processor, cause the processor(s) to:

read an indication representing at least one transport format control parameter for at least partly determining the transport format for at least a first part of the set of REs allocated for transmission, the indication being received on at least a second part of the set of REs allocated for transmission; and demodulate and/or decode data being received on at least the first part of the set of REs allocated for transmission at least partly based on said at least one transport format control parameter.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding wireless device and/or network node may thus be defined as a group of function modules, where each step performed by the processor corresponds to a function module.

The computer program residing in memory may thus be organized as appropriate function modules configured to perform, when executed by the processor, at least part of the steps and/or tasks described herein.

Figure 13:
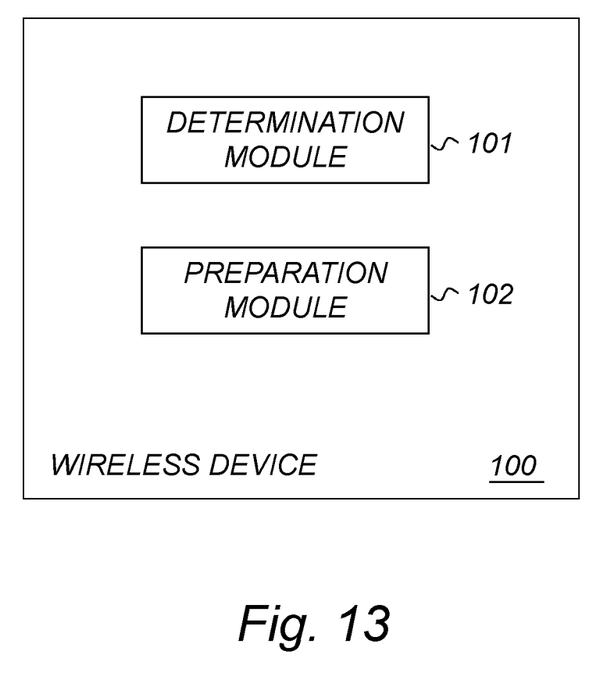
FIG. 13 is a schematic block diagram illustrating an example of a wireless device according to another embodiment.

FIG. 13 is a schematic block diagram illustrating an example of a wireless device according to another embodiment. The wireless device 100 is adapted for supporting transmission to a network node in a wireless communication network based on Long Term Evolution, LTE. The wireless device 100 is allowed to transmit on a set of Resource Elements, REs, allocated for transmission to the network node. The wireless device 100 comprises a determination module 101 for determining at least one transport format control parameter for at least a first part of the set of REs allocated for transmission. The wireless device 100 also comprises a preparation module 102 for preparing an indication representing the at least one determined transport format control parameter for transmission to the network node on at least a second part of the set of REs allocated for transmission.

Figure 14:
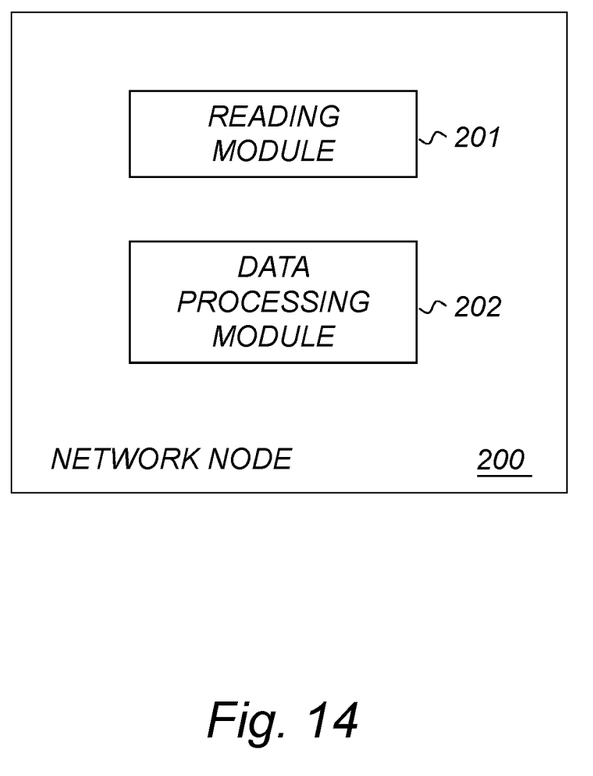
FIG. 14 is a schematic block diagram illustrating an example of a network node according to another embodiment.

FIG. 14 is a schematic block diagram illustrating an example of a network node according to another embodiment. The network node 200 is adapted for demodulating and/or decoding a transmission received from a wireless device on a set of Resource Elements, REs, allocated for transmission to the network node in a wireless communication network based on Long Term Evolution, LTE. The network node 200 comprises a reading module 201 for reading an indication representing at least one transport format control parameter for at least partly determining the transport format for at least a first part of the set of REs allocated for transmission, the indication being received on at least a second part of the set of REs allocated for transmission. The network node 200 further comprises a data processing module 202 for demodulating and/or decoding data being received on at least the first part of the set of REs allocated for transmission at least partly based on the at least one transport format control parameter.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3G Evolution: HSPA and LTE for Mobile Broadband, by Dahlman et al., second edition, 2008, pages 470-476.
[2] 3G Evolution: HSPA and LTE for Mobile Broadband, by Dahlman et al., second edition, 2008, pages 476-477.
[3] Contention-based uplink transmission in unscheduled access, by Sunna, Master's Thesis, 2010.
[4] Contention based uplink transmissions, 3GPP TSG-RAN WG2 #66bis, Los Angeles, USA, Jun. 29-Jul. 3, 2009, R2-093812.
[5] Impacts of contention based uplink in RAN2, 3GPP TSG-RAN WG2 #68bis, Valenica, Spain, Jan. 18-22, 2010, R2-100125.
[6] 3GPP Technical Report TR 36.912, V9.1.0, section 10.

The invention claimed is:

1. A method performed by a wireless device configured for operation in a wireless communication network, the method comprising:
    receiving an indication from a network node of the wireless communication network, indicating a set of Resource Elements (REs) that the wireless device is allowed to use for performing an uplink data transmission; and
    when performing the uplink data transmission:
        using a first subset of the REs to transmit user data, according to a transport format dynamically selected by the wireless device for the uplink data transmission; and
        using a second subset of the REs to transmit an indication of the dynamically selected transport format, according to a transport format known in advance to the network node.

2. The method of claim 1, wherein the first and second subsets of REs are predefined.

3. A method performed by a network node configured for operation in a wireless communication network, the method comprising:
    sending an indication for a wireless device operating in the wireless communication network, indicating a set of Resource Elements (REs) that the wireless device is allowed to use for performing an uplink data transmission;
    receiving the uplink data transmission on the set of REs, wherein a first subset of the REs carry uplink data, according to a first transport format that was dynamically selected by the wireless device, and wherein a second subset of the REs carry an indication of the first transport format, according to second transport format that is known in advance to the network node;
    processing the second subset of the REs according to the second transport format, to recover the indication of the first transport format; and
    processing the first subset of the REs according to the first transport format, to recover the uplink data.

4. The method of claim 3, wherein the first and second subsets of REs are predefined.

* * * * *